United States Patent
Takeda

(10) Patent No.: US 8,366,527 B2
(45) Date of Patent: Feb. 5, 2013

(54) PUZZLE GAME APPARATUS, PROGRAM AND METHOD

(75) Inventor: Kento Takeda, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 577 days.

(21) Appl. No.: 12/559,733

(22) Filed: Sep. 15, 2009

(65) Prior Publication Data

US 2010/0069133 A1    Mar. 18, 2010

(30) Foreign Application Priority Data

Sep. 16, 2008 (JP) ................... 2008-237161

(51) Int. Cl.
*A63F 13/00* (2006.01)
*G06F 19/00* (2011.01)
(52) U.S. Cl. ............... 463/7; 463/9; 463/30; 463/31; 463/34
(58) Field of Classification Search .............. 463/9
See application file for complete search history.

(56) References Cited

U.S. PATENT DOCUMENTS

| 2002/0094854 | A1* | 7/2002 | Morita et al. ............ 463/9 |
| 2005/0266908 | A1 | 12/2005 | Hattori et al. |
| 2008/0254849 | A1 | 10/2008 | Nomura et al. |

FOREIGN PATENT DOCUMENTS

JP    2005334451 A   * 12/2005

OTHER PUBLICATIONS

Tetris DS Instruction Booklet, 2006, Nintendo of America Inc.*

* cited by examiner

*Primary Examiner* — David L. Lewis
*Assistant Examiner* — Werner Garner
(74) *Attorney, Agent, or Firm* — Greenblum & Bernstein, P.L.C.

(57) ABSTRACT

When small blocks are cleared by an object clearance controller (113) in any one of game fields, a field movement controller (114) causes the game fields to move in accordance with the number of the cleared small blocks. The game field in which the small blocks are cleared is caused to move away from a game end determination line while the other game field(s) is caused to move closer to the game end determination line. Thus, a puzzle game is realized, which implements a new display configuration and thereby improves a player's interest. Further, the player is able to intuitively grasp his/her lead over the opponent in the course of a battle.

9 Claims, 9 Drawing Sheets

| NUMBER OF CLEARED BLOCKS (THROUGHOUT CHAIN REACTION) | FIELD MOVEMENT DISTANCE | MOVEMENT DISTANCE WHEN RETURNING TO INITIAL POSITION |
|---|---|---|
| 5 | ONE ROW | ONE ROW/ FIFTEEN SECONDS |
| 10 | TWO ROWS | ONE ROW/ TEN SECONDS |
| 20 | FIVE ROWS | ONE ROW/ FIVE SECONDS |

FIG. 9

PUZZLE GAME APPARATUS, PROGRAM AND METHOD

CROSS REFERENCE TO RELATED APPLICATION

The present disclosure relates to subject matter contained in Japanese Patent Application No. 2008-237161, filed on Sep. 16, 2008, the disclosure of which is expressly incorporated herein by reference in its entirety.

BACKGROUND OF THE INVENTION

1. Field of the Invention

The present invention relates to a video game apparatus, video game program and video game processing method for executing a puzzle game.

2. Description of the Related Art

Conventionally, a puzzle video game is well known, in which a player operates multiple types of blocks that sequentially appear in a game field displayed on a screen. In such a puzzle game, the blocks moved based upon the player's operation and arranged in such a way to satisfy a certain clearance condition are cleared (i.e., removed) from the game field. For example, Japanese Unexamined Patent Publication No. 2005-334451 describes such a puzzle video game in which the game ends when the blocks that do not satisfy the clearance condition pile up to a certain point of height in the game field. Further, in such a video puzzle game, two or more players may fight against each other, while each player operates and deletes the blocks in respective ones of multiple game fields displayed on a screen. In such a VS mode, when the certain clearance condition is satisfied in one of the game fields, new blocks appear in other game fields. The players may win the game by causing more number of blocks to appear and stack earlier in the opponent's game field.

However, in a conventional game like the above, players just move the blocks so as to pile them up in the game field, and therefore they are likely to get bored.

In addition, it is hard for the player to tell whether he/she has an edge over the opponent in the course of playing the game because the player usually pay his/her attention mainly to blocks appearing in his/her own game field and hardly grasp the status of blocks in the opponent's game field.

SUMMARY OF THE INVENTION

It is an object of the present invention to solve the problems described above and to provide a puzzle game implementing a new display configuration and thereby to improve a player's interest.

In addition, it is an object of the present invention to provide a puzzle game, in which a player is able to intuitively grasp his/her lead over the opponent.

According to a first aspect of the invention, there is provided a video game apparatus having an operation unit for receiving a player's input and a display for displaying at least two game fields. The apparatus includes an object displayer that displays an object which sequentially appears from a predetermined position of the game field. The apparatus further includes an object mover that moves a position of the object displayed by the object displayer based upon the input to the operation unit. The apparatus further includes an object clearer that clears the object satisfying a predetermined arrangement condition. The apparatus further includes a game termination controller that causes a game to end when the blocks that are not cleared and stack in the game field reach to a line placed at a predetermined position on the display. The apparatus further includes an field mover that displaces at least one of the game fields in a opposite direction against the line while displacing the other game fields in a direction towards the line when a field displacement condition is satisfied in any one of the game fields, the field displacement condition being associated with clearing of the object by the object clearer.

With such a configuration, a video puzzle game is realized wherein objects are cleared in each of at least two game field displayed on a display, at least one of the game field being moved toward a line for determining an end of the game while the other game field(s) being moved in an opposition direction against the line. Generally, in a VS-mode puzzle games, a player pays his/her attentions to the player's own game field and has no room for watch the other player's game field. Accordingly, it is hard for the player to objectively grasp whether he/she has an edge of the opponent on the game progress. The configuration as described above allows the player to intuitively grasp his/her lead over the opponent, and thereby allowing the player to enjoy more exciting game progress. In other words, because the game field in which the larger number of objects is cleared is caused to move away from the game field, the lead among the players is determined based upon the difference between the numbers of cleared objects. In addition, with such configuration, the player is able to easily and intuitively grasp whether he/she has an edge over the opponent in the course of the game progress even when he/she gazes at his/her own game field. Accordingly, more exciting game progress is realized.

In the video game, apparatus, the object displayer may display multiple kinds of the objects. The object clearer may clear a predetermined number of the objects of a same kind among the multiple kinds that are arranged without gaps.

With such configuration, the objects are cleared in the game field by causing the predetermined numbers of the objects of a same kind to be arranged without gaps by the object mover based upon an input to the operation unit.

In the video game apparatus, the field displacement condition is that the object clearer clears the objects in any one of the game fields.

With such configuration, when the objects satisfying the predetermined arrangement condition are cleared, the game field in which the clearance of the object is executed is caused to move in the opposite direction against the line for determining the end of the game, and thereby the player is given an edge on the game progress. Meanwhile, the other game field is caused to move closer to the line, the player may lose ground on the game progress. Because the field is moved every time the objects are cleared, the player is able to enjoy various ways of the game progress depending on the status of the clearance of the objects.

In the video game apparatus, the field mover may lengthen a distance of displacement of the game field in proportion to a number of the objects cleared by the object clearer.

With such configuration, as the numbers of the objects cleared in the game field increase, the game field is caused to move further away from the line for determining the end of the game. Meanwhile, the other game field is caused to much closer to the line. Since the distance of the displacement of the game fields changes in accordance with the numbers of the cleared objects, the player may decide the numbers of the objects to be cleared or the timing of the clearance depending upon the status of the game progress so as to advance the game more strategically.

The video game apparatus may further include a field remover that redisplaces the game field displaced by the field mover towards a direction of an initial position at which the game field is positioned at a beginning of the game.

With such configuration, after the field mover causes the game field to move closer to or away from the line for determining the end of the game, the fields may be caused to move gain so as to return to the initial position. Such returning movement of the game field allows the player, who once loses ground, to continue to play the game with patience and thereby coming over the disadvantageous situation. Thus, the more exciting game progress is realized.

The video game apparatus may further include a timer that counts a predetermined period of time elapsed since the displacement of the game field by the field mover. The field re-mover may redisplace the game field towards the initial position by a predetermined distance when the timer counts the predetermined period of time elapsed since the displacement of the game field by the field mover. The predetermined period of time to be counted by the timer may be decreased in proportion to the number of objects cleared by the object clearer.

With such configuration, as the number of the objects cleared in the game field increase, the distance of the movement of the game field moved by the field mover gets longer while the time period to be counted until the return to the initial position by the field re-mover gets shorter. On the other hand, as the numbers of the objects cleared in the game field decrease, the distance of the movement of the game field moved by the field mover gets shorter while the time period to be counted until the return to the initial position by the field re-mover gets longer. Accordingly, even when the large numbers of the objects are cleared in the game field and thereby the game field is caused to move by a long distance, the game field may be returned back to the initial position is a short time. This allows the player, who once loses ground, to continue to play the game with patience and thereby coming over the disadvantageous situation. Thus, the more exciting game progress is realized.

In the video game apparatus, the game fields may be assigned to respective ones of the players, and the object mover may move the objects displayed in each of the game fields assigned to the players based upon an input by each player to the operation unit.

With such configuration, the objects displayed in each of the at least two game fields are moved based upon the input to each operation unit by each player, and thereby a battle among multiple players is realized.

According to a second aspect of the invention, there is provided a video game program for causing a video game apparatus to process a game. The video game apparatus includes an operation unit for receiving a player's input and a display for displaying at least two game fields process a game. The program causes the video game apparatus to display an object which sequentially appears from a predetermined position of the game field. The program further causes the video game apparatus to move a position of the object displayed based upon the input to the operation unit. The program further causes the video game apparatus to clear the object satisfying a predetermined arrangement condition. The program further causes the video game apparatus to cause a game to end when the blocks that are not cleared and stack in the game field reach to a line placed at a predetermined position on the display. The program further causes the video game apparatus to displace at least one of the game fields in a opposite direction against the line while displacing the other game fields in a direction towards the line when a field displacement condition is satisfied in any one of the game fields, the field displacement condition being associated with the clearing of the object.

According to a third aspect of the invention, there is provided a video game processing method for a video game apparatus having an operation unit for receiving a player's input and a display for displaying at least two game fields. The method includes an object displaying step of displaying an object which sequentially appears from a predetermined position of the game field. The method further includes an object moving step of moving a position of the object displayed at the object displaying step based upon the input to the operation unit. The method further includes an object clearing step of clearing the object satisfying a predetermined arrangement condition. The method further includes a game termination controlling step of causing a game to end when the blocks that are not cleared and stack in the game field reach to a line placed at a predetermined position on the display. The method further includes an field moving step of displacing at least one of the game fields in a opposite direction against the line while displacing the other game fields in a direction towards the line when a field displacement condition is satisfied in any one of the game fields, the field displacement condition being associated with the clearing of the object at the object clearing step.

According to the present invention, an object game is realized, which implements a new display configuration and thereby improve a player's interest by displaying objects in multiple game fields displayed on a screen, clearing a predetermined numbers of the objects of a same kind arranged without gaps, causing the game field in which the objects are cleared to move away from a game end determination line displayed in a fixed position of the screen while causing the other game field(s) to move closer to the game end determination line.

Further, the players are allowed to battle against each other by causing the objects displayed on the multiple game fields to move in accordance with the operations by respective ones of the players. In such a battle, since the game fields moves closer to or away from the game end determination line as described above, the player is able to intuitively grasp his/her lead over the opponent(s)

BRIEF DESCRIPTION OF THE DRAWINGS

FIGS. 3A to 3E are explanatory views showing an example of a game screen displayed on a display of the game apparatus;

FIG. 9 is an explanatory views showing an example of the number of cleared small blocks, a distance of movement of a game field and a distance of movement of a game field back to an initial position according to an embodiment of the invention.

DESCRIPTION OF THE PREFERRED EMBODIMENTS

Hereafter, a description will be given of an embodiment of the invention with reference to the appended drawings.

Figure 1:
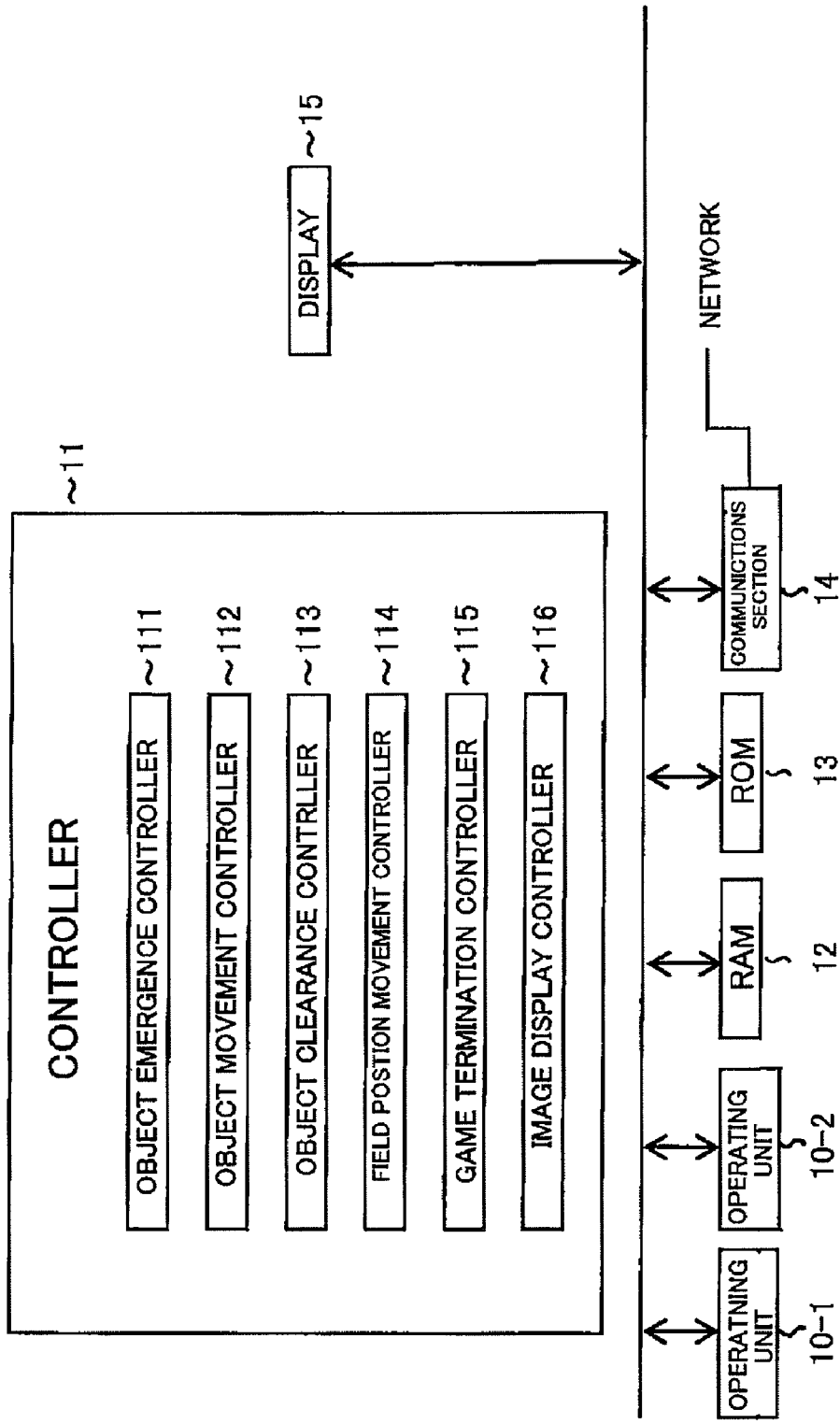
FIG. 1 is a block diagram showing an example of a configuration of a video game apparatus according to an embodiment of the invention.

FIG. 1 is a block diagram showing a game apparatus 1 according to a present embodiment. In the present embodiment, an explanation will be given to an example where the game apparatus 1 is constituted by a personal computer with a game program stored therein. The computer herein means an information processing apparatus including a storage device, a control section, etc. The game apparatus 1 is an information processing apparatus including a memory section, a controller, etc. A coin-operated arcade game, a home-use game machine, a mobile phone and the like may be included in a concept of computer of the present invention.

As shown in FIG. 1, the game apparatus 1 includes an operating section 10, a controller 11, a random access memory (RAM) 12, a read only memory (ROM) 13, a communications section 14 and a display 15.

The operating section 10 is an input device for receiving a player's operation, and constituted by, for example, a mouse, a game controller, a keyboard or the like. Herein, in order to simplify the explanation, it is assumed that the mouse is used.

The RAM 12 is used as a main memory for control processing by the controller 11.

The ROM 13 stores a game program for causing the computer to execute processing by each component of the present invention.

The controller 11 executes game arithmetic processing, image generating processing and the like based upon the programs and the like stored in the ROM 13 by using the RAM 12 as a main memory. The controller 11 includes an object emergence controller 111, an object movement controller 112, an object clearance controller 113, a field position movement controller 114, a game termination controller 115 and an image display controller 116.

The object emergence controller 111 executes processing for causing objects to appear in a game field displayed on the display 15. More specifically, the object emergence controller 111 causes an object such as a block, which serve as puzzle game element, to emerge from a predetermined position of the game field.

The object movement controller 112 moves and rotates the objects displayed in the game field based upon the operation data input to the operation section 10.

The object clearance controller 113 executes processing for clearing the objects while the game is in progress.

The field position movement controller 114 executes processing for displacing the game field.

The game termination controller 115 determines whether a state of the game progress satisfies a predetermined condition for causing the game to end, and executes processing for terminating the game.

The image display controller 116 generates images based upon results of game processing executed by the controllers 111 to 115, and outputs the generated images to the display 15. The generated images may be either two-dimensional images or three-dimensional images. The processing by these controllers will be described below in detail.

Figure 2:
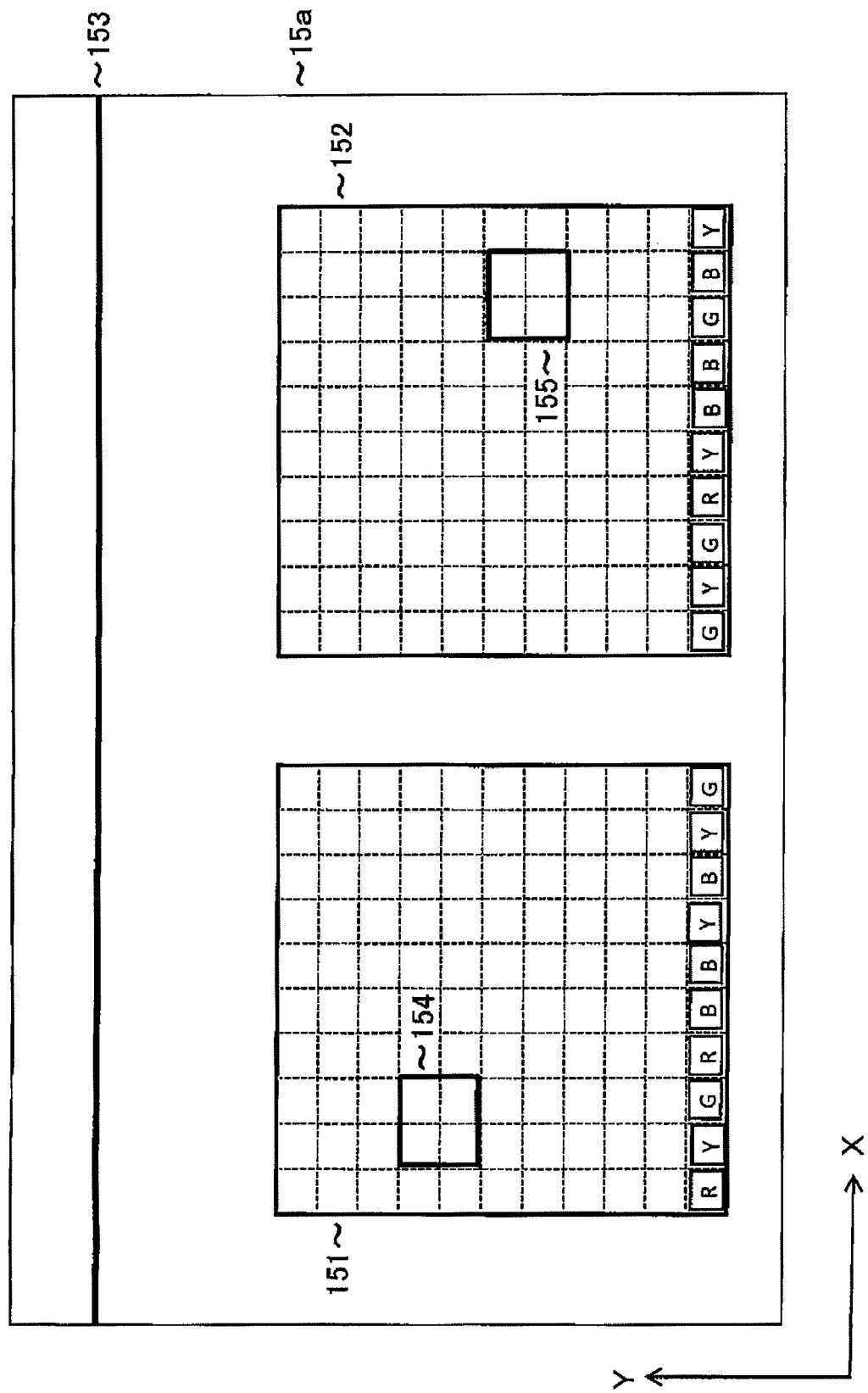
FIG. 2 is an explanatory view showing an example of a game screen displayed on a display of the game apparatus.

FIG. 2 shows an example of a game image displayed on the display 15 according to this embodiment. As shown in FIG. 2, a first game field 151 and a second game field 152, which is a rectangle consisted of four arbitrary vertexes, are positioned side by side on a display screen 15*a*. In addition, a game end determination line 153 is positioned in the upper above the first and the second game fields 151 and 152 in the direction of X-axis.

For example, the first game field 151 and the second game field 152 may be respectively constituted by an object such as a sprite (or layer) positioned in X-Y absolute coordinates. In this case, relative coordinates are provided on each of the first and second game fields 151 and 152, and a movement control of small blocks, which will be described below, is executed in each of the relative coordinates. The small block may be preferably constituted by an object such as a sprite provided independently from the game field. The game end determination line 153 may be provided in the X-Y absolute coordinates.

As an alternative example, an X-Y plane of coordinates may be provided as a reference billboard (i.e., plate-shaped polygon) in three-dimensional world coordinates. The first and second game fields 151 and 152 may be respectively constituted by a plate-shaped polygon arranged parallel to the reference billboard. In this case also, the relative coordinates are set on each of the first and the second coordinates 151 and 152, and the movement control of the small blocks, which will be described below, is executed in each of the relative coordinates. The small block is constituted by an object such as a polygon separately provided from the game fields. The game end determination line 153 may be provided on the reference billboard.

As a further alternative example, the first and the second game fields and the game end determination line 153 may be provided on a single X-Y coordinates. In this case, the movement of the first and the second game fields 151 and 152 may be executed by displacing dots on the X-Y coordinates or by similar methods.

The object emergence controller 111 causes multiple types of objects to appear from a bottom line of each of the game field 151 and 152 intermittently. In this embodiment, as shown in FIG. 2, the objects are constituted by rectangle-shaped small blocks of various colors. For example, in FIG. 2, R, G, B and Y represent red, green, blue and yellow, respectively. In each of the first and the second game fields 151 and 152, the small blocks are arranged in ten rows in the direction of X-axis and eleven columns in the direction of Y-axis.

Further, a first cursor 154 and a second cursor 155 are displayed in the first and the second game fields 151 and 152, respectively. Each of the first and the second cursor 154 and 155 may select four small blocks.

In this embodiment, the small blocks displayed in the first game field 151 are moved and rotated by the object movement controller 112 based upon an input to the operating section 10-1 by a first player. Also, the small blocks displayed in the second game field 152 are moved and rotated by the object movement controller 112 based upon an input to the operation section 10-2 by a second player or based upon the control by a CPU. In other words, the first player may battle against and the second player or the computer.

Hereinafter, the detailed explanation will be given to the emergence of the small blocks by the object emergence controller 111, the movement and rotation of the small blocks by the object movement controller 112 and the clearance of the small blocks by the object clearance controller 113. The explanation will be given to the processing in the first game field 151 as an example, but it should be noted that the same processing is also executed in the second game field 152.

Figures 3A, 3B, 3C, 3D, 3E:
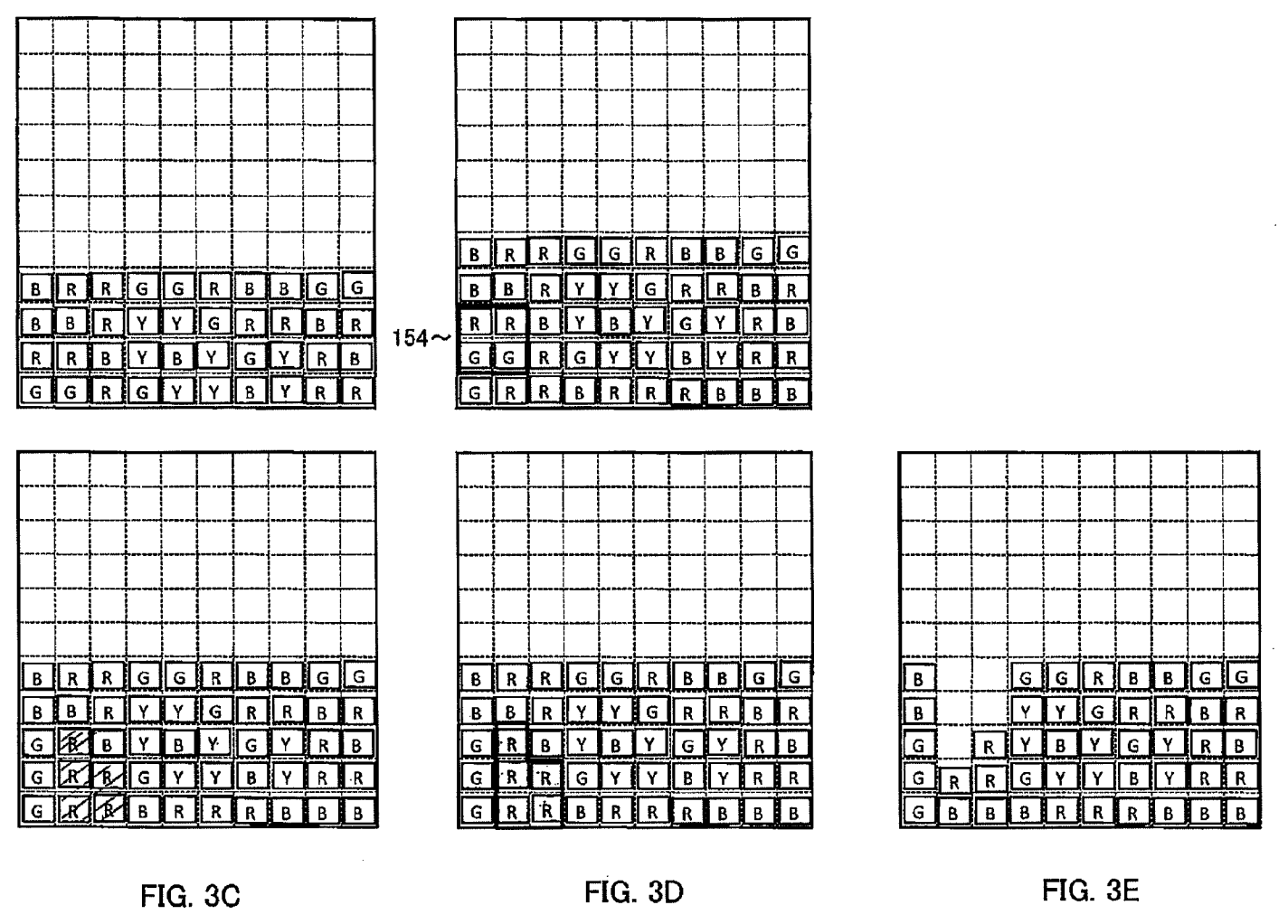

Firstly, as shown in FIG. 3A, the object emergence controller 111 causes forty small blocks arranged in four rows in the direction of X-axis to emerge from the bottom line of the first game field 151. Then, as shown in FIG. 3B, the object emergence controller 111 causes further ten small blocks 161 arranged in one row to emerge from the bottom line at a predetermined time interval and to displace the forty blocks that has been already displayed up by one row.

Next, as shown in FIG. 3B, the first player operates the operating unit 10-1, which is constituted by a mouse for example, so as to select four small blocks (R, R, G and G, in a clockwise direction starting from left corner) by the cursor 154. Next, the first player clicks a left button of the mouse 10 with keeping the four small blocks being selected by the cursor 154. Then, the object movement controller 112 moves the positions of the selected four blocks as they circulate in a clockwise direction inside the cursor 154. As a result, the small blocks are arranged in the first game field 141 as shown in FIG. 3C.

When at least four small blocks of a same color are arranged without gaps shown in a shadowed area of FIG. 3C, the object clearance controller 113 determines that a predetermined arrangement condition is satisfied, and switches a display status of the small blocks satisfying the arrangement condition, that is, the five red small blocks. As shown in FIG. 3D, for example, the five red small blocks are displayed as a set of blocks being surrounded with a frame. Next, when the first player clicks the right button of the operating section 10-1, the object clearance controller 113 clears the small blocks satisfying the arrangement condition, that is, the small blocks within the frame. The first player may causes the object movement controller 112 to repeat the movement/ circulation processing of the small blocks based upon the first user's operation of moving the cursor 154 and clicking the left button of the mouse until causing the object clearance controller 113 to clear the small blocks. In other words, the first player may click the right button of the operating section 10-1 after arranging two or more set of blocks consisted of satisfying small blocks. This causes the small blocks making up the sets of blocks to be cleared at once. The small blocks that have been positioned above the cleared small blocks drop down by a distance equal to the rows of cleared small blocks. As a result, the small blocks get arranged in the first game field 151 as shown in FIG. 3E. When the small blocks that fallen down causes the arrangement condition to be newly satisfied, that is, causes a new set of four or more small blocks of a same color to be arranged without a gap, the object clearance controller 113 clears the new set of small blocks consecutively.

The emergence, movement and clearance processing as described above are performed also in the second game field 152 based upon the input to the operating section 10-2 by the second player or the control by the CPU.

Figure 4:
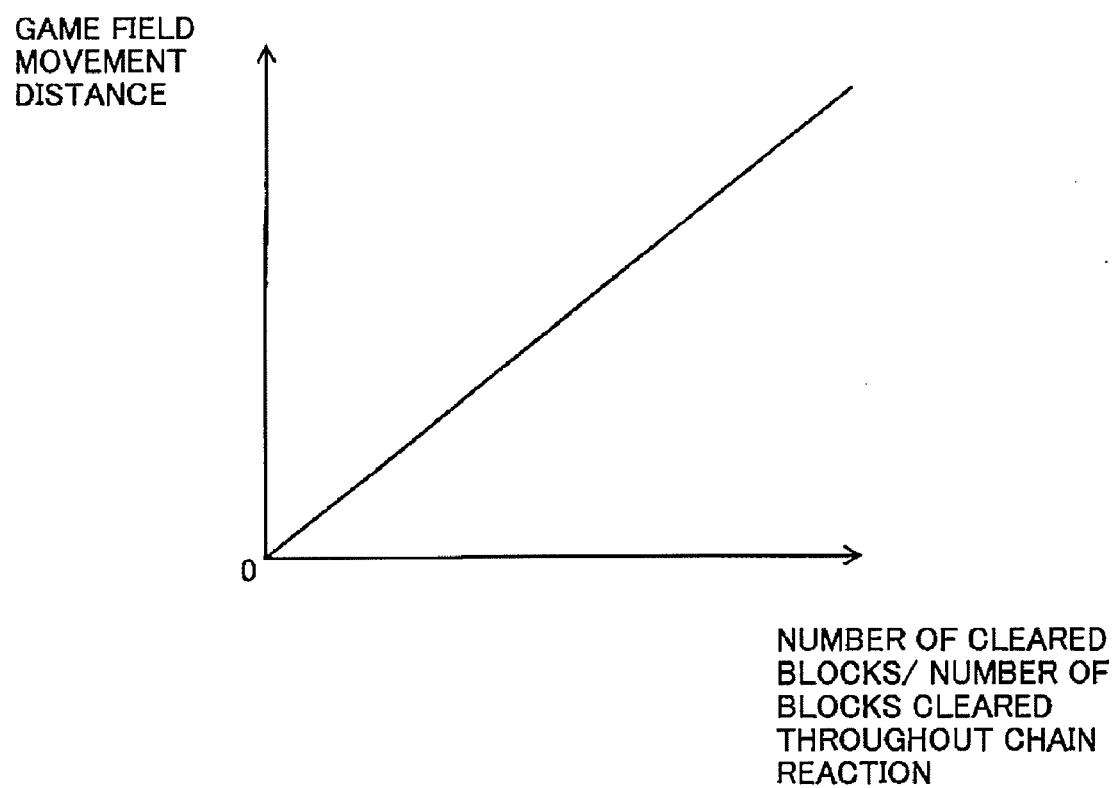
FIG. 4 is an explanatory view showing an example of relationship between the number of cleared blocks and the distance of movement of a game field according to an embodiment of the invention.

Next, a battle between the first game field 151 and the second game field 152 will be described hereinafter. The field position movement controller 114 moves the portions of the first and the second game fields 151 and 152 up and down along with the Y-axis in accordance with the number of the small blocks cleared in each game field. When the object clearance controller 113 clears the small blocks in either one of the first game field 151 and the second game field 152, the field position movement controller 114 moves the game field in which the small blocks are cleared down along with the Y-axis and moves the other game field up along with the Y-axis. Further, as shown in FIG. 4, the distance of the movement increases/decreases in accordance with the number of the cleared small blocks. In other words, the larger the number of the cleared small blocks is, the longer the distance of the movement of the first and the second game fields 151 and 152 by the game field position movement controller 114 is. The movement may be made not only by the distance in the direction of Y-axis on the display 15 but also by the number of rows of the small blocks.

Further, as described above, when the object clearance controller 113 clears the four or more small blocks of a same color which are arranged without gaps, the small blocks that have been arranged above the cleared small blocks fall down. If this causes the arrangement condition to be again satisfied, that is, causes additional four or more small blocks of a same color to be arranged without gaps, the additional four or more small blocks are cleared consecutively. In such a case where the clearances of the small objects are executed consecutively by the objet clearance controller 113 as described above, the field position movement controller 114 moves the first and the second game fields 151 and 152 after such chain reaction of clearances of the small blocks as above finish. In other words, the distance of the movement is determined based upon the total number of the small blocks that are cleared from the beginning of the chain reaction of clearances to the end thereof. More specifically, the larger the number of the cleared small blocks throughout the chain reaction of clearances is, the longer the distance of the movement is, as shown in FIG. 4.

The game termination controller 115 determines whether the stack of small blocks that are not cleared and pile up in either one of the first game field 151 and the second game field 152 reaches the game end determination line 153. When the game termination controller 115 determines that the stack of the small blocks reaches the game end determination line 153, it causes the game to end.

Since the game end determination line 153 is displayed in a fixed position on the display screen 15a as described above, a player (or CPU) is given an edge on the game progress, if he/she (or CPU) operates the movement of the small blocks in the game field which is moved downward along with the Y-axis by the field position movement controller 114, that is, in which game field the larger number of the small blocks are cleared than in the other game field. On the other hand, a player (or CPU) loses ground on the game progress if he/she (or) CPU operates the movement of the small blocks in the game field which is moved upward along with the Y-axis by the field position movement controller 114, that is, in which game field the smaller number of small blocks are cleared.

As described above, the distance of the movement of the game fields are determined based upon the number of the small blocks cleared in a single clearance processing. Further, when the clearances of the small blocks by the object clear controller 113 are executed consecutively, the distance of the movement of the game fields is determined based upon the total number of the small blocks cleared from the beginning of the consecutive clearances to the end thereof. Accordingly, the player moves and arranges the small blocks in the game field with the aim of clearing as many blocks as possible at once and/or with the aim of causing as many chain reactions of clearances as possible to occur. Rotating and moving the small blocks with the aims as above causes a large number of the small blocks to be arranged and piled up in the game fields until the clearing processing is executed, and the player may lose ground on the game progress. However, once such large number of the small blocks is cleared by the clearance processing or the chain reaction of the clearances in the player's game field, the opponent's game field gets moved closer to the game end determination line 153 while the player's own game field gets moved more away from the game end determination line 153.

Hereinafter, a game progressing procedure will be described with reference to FIGS. 5 to 8.

Figure 5:
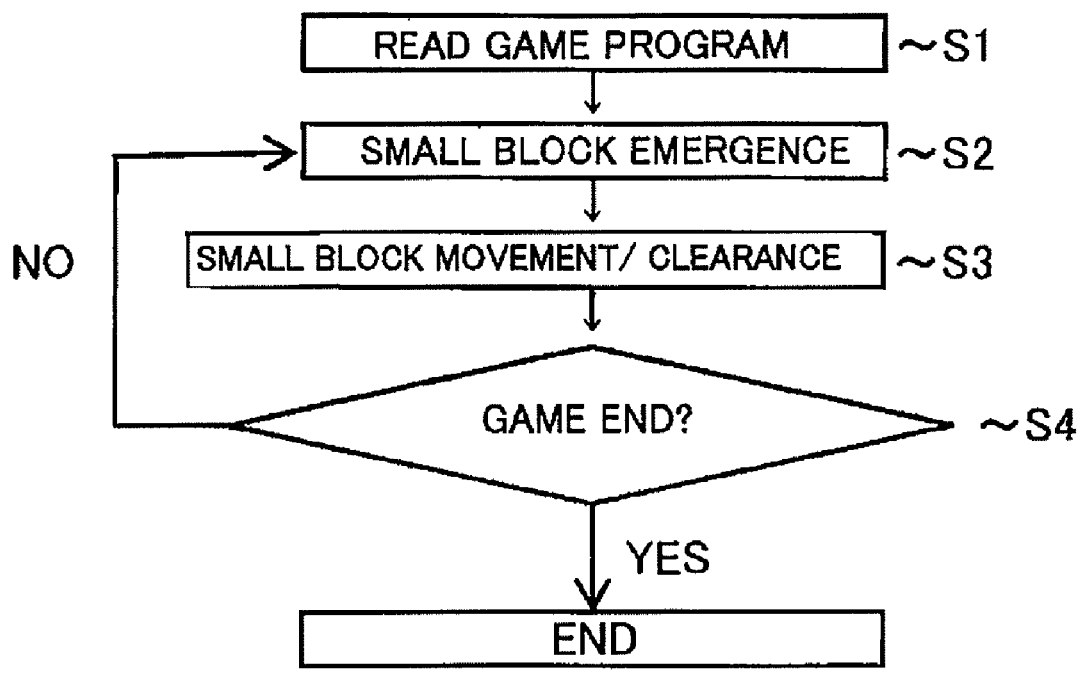
FIG. 5 is a flowchart showing an example game progressing procedure according to an embodiment of the invention.

FIG. 5 is a flowchart showing an example game progressing procedure according to an embodiment. Firstly, at step S1, the controller 11 reads a game program stored in the ROM 13 and executes processing as described below in accordance with the game program.

Next, at step S2, the small blocks emerge from the bottom of the first and the second game fields 151 and 152. Then, at step S3, the small blocks are moved in the first and the second game fields 151 and 152 based upon the player's input to the operating sections 10-1 and 10-2 respectively, and the small blocks satisfying the arrangement condition are eliminated. It should be noted that the processing at step S2 is executed at a certain time interval that is independently counted as described below, and therefore processing at step S2 and step S3 may be executed simultaneously or in reverse order. At step S4, the game termination controller 115 determines whether a game termination flag has been set as a result of processing at step S2 and step S3. When the game termination controller 115 determines that the game termination flag has been set (S4: YES), it displays an image for indicating a game end on the display screen 15a and causes the game to end. Meanwhile, when the game termination controller 115 determines that the game termination flag has not been set, the processing procedure returns back to step S2.

Figure 6:
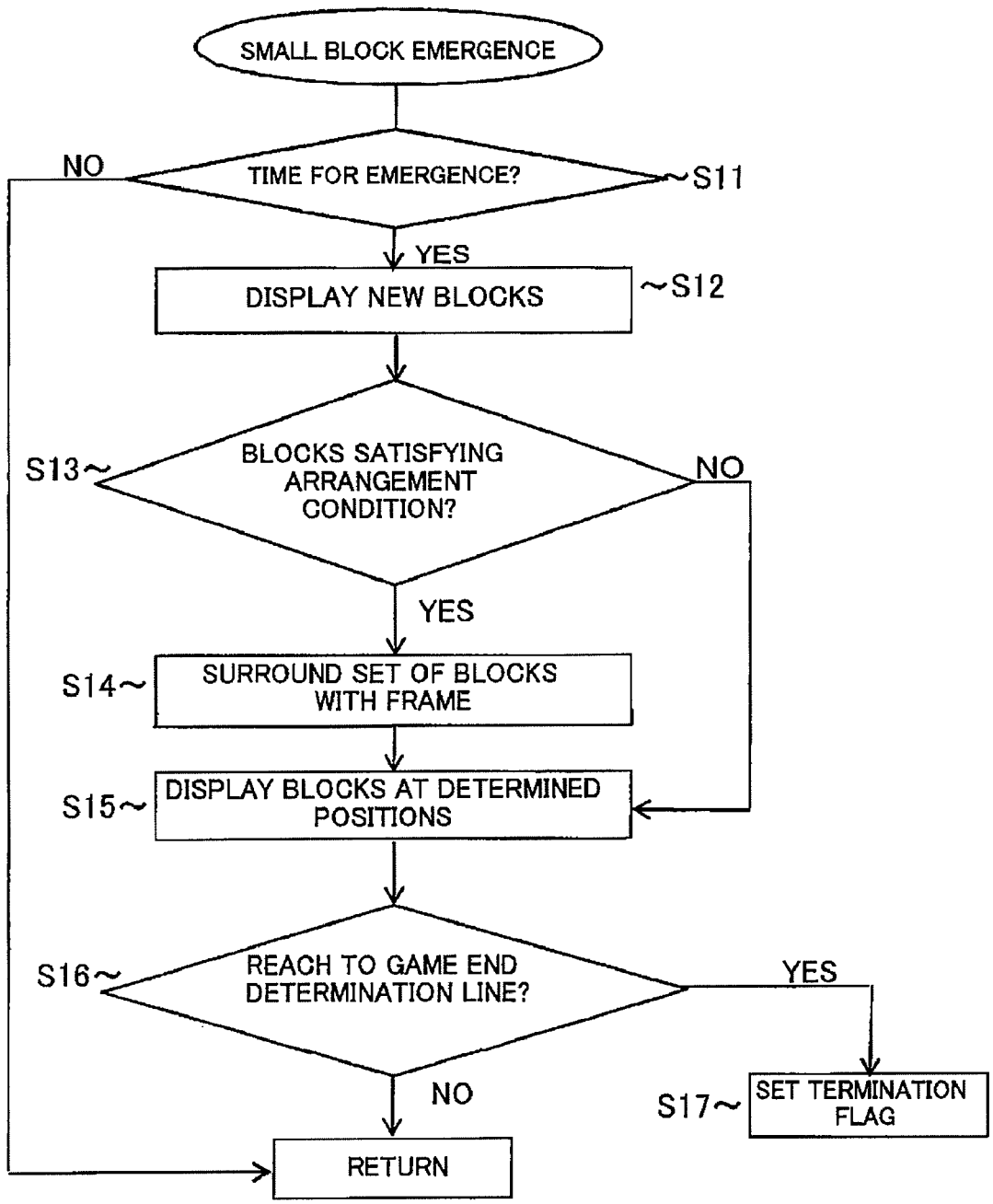
FIG. 6 is a flowchart showing an example of detailed processing procedure for emergence of small blocks according to an embodiment of the invention.

FIG. 6 is a flowchart showing an example of detailed processing procedure for the emergence of the small blocks executed at step S2. The explanation will be given to the processing procedure for the emergence of the small blocks in the first game field 151 as an example, but it should be noted that the same processing procedure is also executed in the second game field 152 based upon control by the CPU.

Firstly, at step S11, the object emergence controller 111 determines whether it is the time to cause a new row of small blocks to appear in the first game field 151 based upon a timer (not shown) incorporated in the game apparatus 1. For example, the object emergence controller 111 determines whether the timer counts a predetermined time period and the counter value gets to zero.

When the object emergence controller 111 determines that it is the time to cause the row of small blocks to appear (S11: YES), it displays the new row of the small blocks in the bottom of the first game field 151 (step S12). If there are previously-arranged small blocks in the game field 151, the previously-arranged small blocks are moved up by one row. When the object emergence controller 111 determined that it is not the time to cause the new row of small blocks to emerge (S11: NO), the processing procedure for the emergence of the small blocks ends.

At step S13, the object clearance controller 113 determines whether there are the small blocks satisfying the predetermined arrangement condition. In this embodiment, it determines whether there are four or more blocks of a same color arranged without gaps. When the object clear controller determines that there are the small blocks satisfying the arrangement condition (S13: YES), it displays such small blocks as being surrounded with a frame so as to form a single set of blocks (step S14). Meanwhile, when the object clearance controller 113 determines that there are no small blocks satisfying the arrangement condition, it displays the all small blocks with their positions and appearances remain unchanged (step S15).

Next, at step S16, the game termination controller 115 determines whether the uncleared small blocks stacked in the first game field 151 or the second game field 152 reaches the game end determination line 153. When the game termination controller 115 determines the stack of the uncleared small blocks reaches the game end determination line 153 (S16: YES), it sets the game termination flag (S17). When the game termination controller 115 determines that the stack of the uncleared small blocks does not reach the game end determination line 153 (S16: NO), the processing procedure returns back to step S11 without executing the processing of step S17. The processing procedure for the emergence of the small blocks as above is executed repeatedly until the game termination flag is set.

Figure 7:
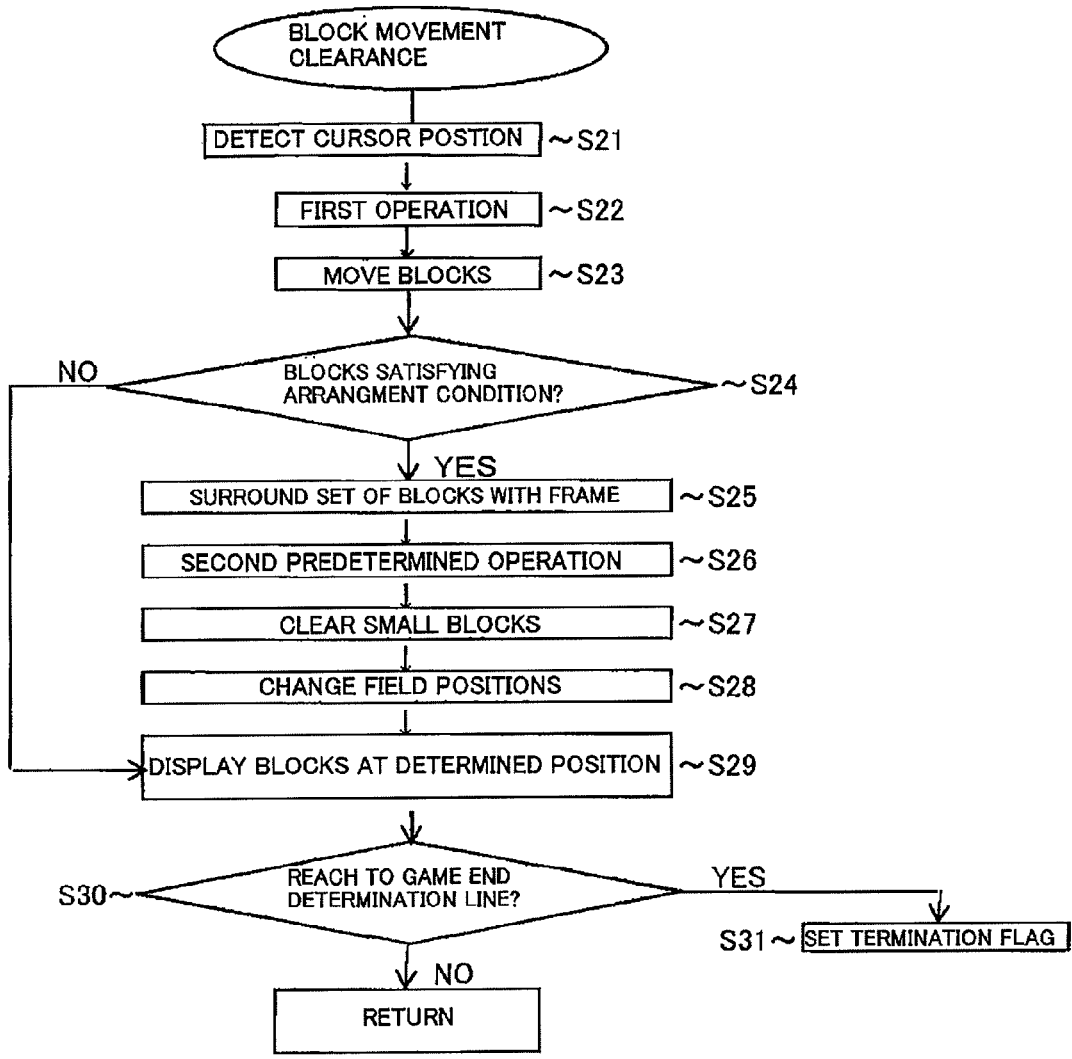
FIG. 7 is a flowchart showing an example of detailed processing procedure for movement of small blocks according to an embodiment of the invention.

FIG. 7 is a flowchart showing an example of detailed processing procedure for the movement of the small blocks executed at step S3 of FIG. 5. The explanation will be given to the processing procedure for the movement of the small blocks in the first game field 151 based upon the first player's input to the operating section 10-1, but it should be noted that the same processing procedure is also executed in the second game field 152 based upon the second player's input to the operating section 10-2 or based upon control by the CPU.

Firstly, at step S21, the object movement controller 112 detects a current position of the first cursor 154 based upon the first player's input to the operating section 10-1. Next, when the first player inputs a first predetermined operation using the operating unit 10-1 with the first cursor 154 positioned at the detected position (S22), the small blocks in the cursor 154 move (S23). Specifically, in this embodiment, when the first player clicks the left button of the mouse serving as the operating section 10-1, the small blocks move. The way of the movement is as described above with reference to FIG. 3. If a subsequent first predetermined operation is not input to the operating section 10-1 within 0.5 seconds since the previous first predetermined operation, the object clearance controller 113 determines whether there are small blocks satisfying the predetermined arrangement condition at step S24. Specifically, in this embodiment, the object clearance controller 113 determines whether any four or more small blocks are arranged without gaps. When the object clearance controller 113 determines that there are small blocks satisfying the arrangement condition, it displays the small blocks satisfying the arrangement condition as being surrounded with a frame (S25). Next, when the first player inputs a second predetermined operation to the operating section 10-1 (S25), the object clearance controller 113 clears the small blocks surrounded with the frame (S27). Specifically, in this embodiment, when the first player clicks the right button of the mouse, the small blocks surrounded with the frame are cleared. If one or more small block(s) has been already arranged above the cleared small blocks, such small blocks fall down by the number of rows of cleared small blocks. If this causes the arrangement condition to be newly satisfied, the small blocks newly satisfying the arrangement condition are cleared consecutively. That is, the processing at step S27 is executed repeatedly. If the object clearance controller 113 determines that there are no small blocks satisfying the arrangement condition at step S24, it displays the small blocks with their positions and appearances remain unchanged (S29).

Figure 8A:
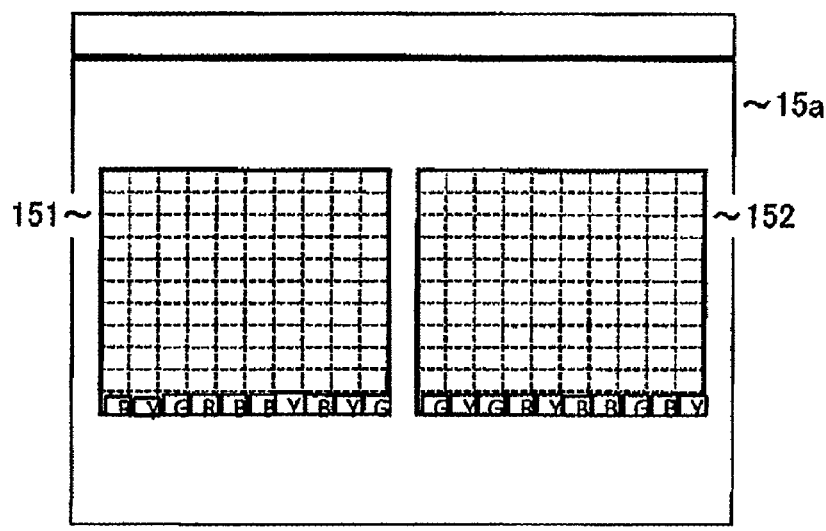
FIGS. 8A to 8C are explanatory views showing an example of a game screen displayed on a display of the game apparatus according to embodiment of the invention.
Figure 8B:
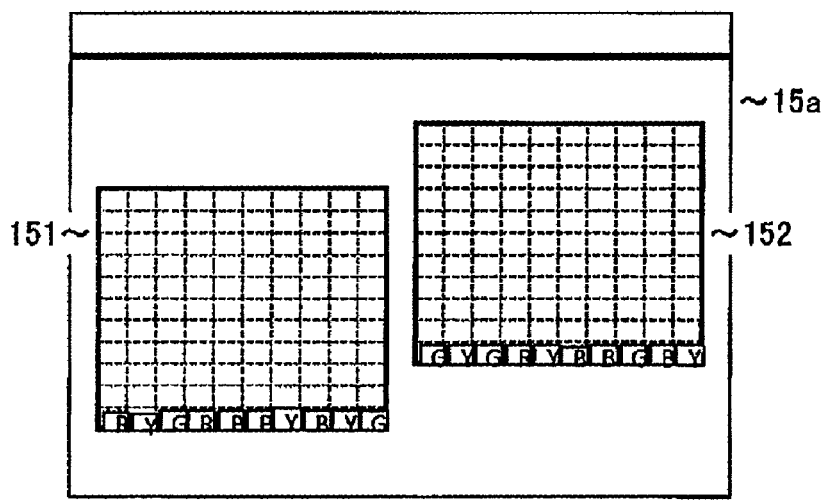
Figure 8C:
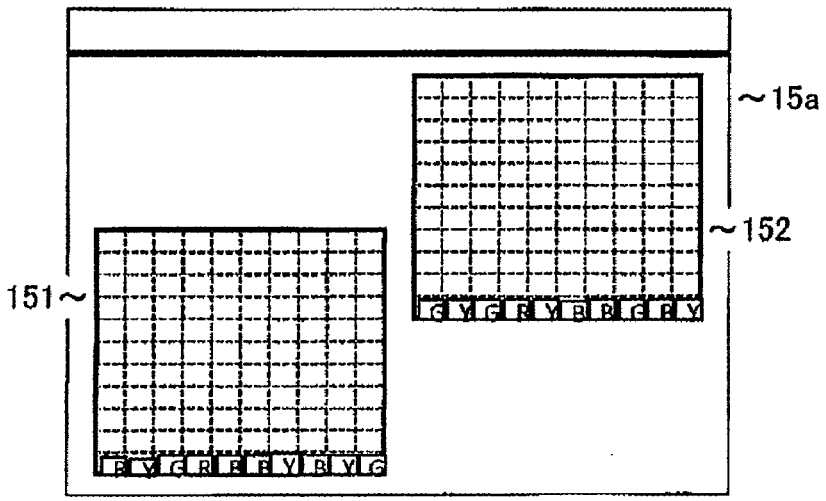

Next, at step S28, the field position movement controller 114 changes the positions of the first and the second game fields 151 and 152 on the display screen 15a based upon the number of the small blocks cleared at step S27. FIG. 8A shows an example of image displayed on the display screen 15a before the processing by the field position movement controller 114 is executed. FIGS. 8B and 8C show examples of images displayed on the display screen 15a after the processing of step S15 is executed. More specifically, FIG. 8B shows an exemplary image displayed when ten small blocks are cleared in the first game field 151 at step S27. FIG. 8C shows an exemplary image displayed when the clearances of the small blocks (S27) are executed consecutively and thus twenty small blocks are cleared from the beginning of the chain reaction of clearances to the end of thereof in total. The distance of the movement of each game field is determined based upon the number of the small blocks cleared in each game field or based upon the total number of the small blocks cleared from the beginning of the chain reaction of clearances to the end thereof, as explained above with reference to FIG. 4. Meanwhile, when the field position movement controller 114 determines that the bottom line of the game field in which the clearance of the small blocks are executed at step S27 reaches the bottom of the display screen 15a, it does not cause such game field down along with the Y-axis, and only causes the other game field move up along with the Y-axis.

At step S29, the object movement controller 112 fixes the positions of the small blocks which do not satisfy the arrangement condition, and displays them in the fixed positions. The procedure for the movement of the small blocks is executed repeatedly or multiple procedures for the movement are executed in parallel.

At step S30, the game termination controller 115 determines whether the stack of the uncleared small blocks in either one of the first and the second game fields 151 and 152 reach the game end determination line 153. When the game termination controller 115 determines that the stack of the uncleared blocks reaches the game end determination line 153 (S30:YES), the game termination controller 115 sets the game termination flag (S31). When the game termination controller 115 determines that the stack of the uncleared small blocks does not reach the game end determination line 153 at step S30, the processing procedure for the movement of the small blocks ends without executing the processing of step S31.

When the game termination flag is set at step S17 or S31, the game termination controller 115 causes the game to end at step S4 as shown in FIG. 5.

As described above, in the game apparatus of the present embodiment, the positions of the game fields are changed in accordance with the number of the small blocks cleared in the course of the battle of the block game. The game field in which the small blocks are cleared is moved away from the game end determination line, while the other game field is moved closer to the game end determination line. Since the game end determination line is displayed in a fixed position (height) of the display screen, the player is able tell intuitively whether he/she has an edge over the opponent in the game play.

Further, in the case where the clearances of the small blocks are executed repeatedly in any one of the game fields, the distance of the movement of each game field is determined in accordance with the total number of small blocks cleared from the beginning of the chain reaction of clearances to the end thereof. Accordingly, the player moves and arranges the small blocks in the game filed with the aim of causing as many chain reactions of clearances as possible to occur. If the player arranges the small blocks with the aim of causing more numbers of chain reactions to occur, more small blocks should pile up in the game field until the chain reactions start. As a result, the player may temporarily lose ground on the game progress. However, once the chain reaction is started and completed, the opponent's field is moved much closer to the game end determination line while the player's own game field is moved more away from the game end determination line. Thus, it is possible to realize a game that requires more strategic operation of the player.

In the above-described embodiment, the game fields are moved every time the clearance of the small blocks is executed or the chain reactions of the clearance finish. However, in an alternative embodiment, the number of the cleared small blocks may be calculated with respect to each game field every time the timer counts a predetermined time period. In such alternative embodiment, the movement of the game fields may be controlled based upon the difference of the calculated numbers of the cleared blocks in respective game fields. Specifically, based upon a result of the calculation, the game field in which the larger numbers of small blocks are cleared within the predetermined time period may be moved away from the game end determination line. Meanwhile, the other game field in which the smaller numbers of small blocks are cleared within the time period may be moved closer to the game end determination line. In this case, the distance of the movement of each game field may get longer in proportion to the difference in the number of cleared blocks.

In a further alternative embodiment, a predetermined field movement condition associated with the clearance of the blocks may be provided in advance. In such alternative embodiment, the game field that satisfies the predetermined field movement condition is moved away from the game end determination line while the other game field is moved closer to the game end determination line. The predetermined field movement condition may be, for example, to clear twenty small blocks. Alternatively, the field movement condition may be to clear ten small blocks of a certain type in combination of clearing additional fifteen small blocks of another type. The different field movement conditions may be set to the respective game fields. Also, the field movement conditions may be varied in accordance with game progress. Alternatively, the number of blocks to be cleared for moving the game fields may be increased or decreased as the game filed gets moved closer to the game end determination line. In the case where the number of small blocks to be cleared for moving the game fields is decreased with respect to the game field that has been moved closer to the game end determination line as the game field get moved closer to the line, the battle is likely to be close, and the players may enjoy exciting game progress. Meanwhile, in the case where the number of small blocks to be cleared for moving the game field is increased, the number of small blocks cleared early in the game progress may make a significant effect on the outcome of the game, and the player may enjoy speedy game progress.

In the embodiment described above, the explanation is given to a case where the first player battles against the second player or CPU. In an alternative embodiment, three or more game fields may be displayed on the display screen and three or more players or CPU may battle against each other. In such alternative embodiment, the number of small blocks cleared in each game field may be calculated at predetermined time intervals. Based upon the calculation result, the game field in which the largest numbers of small blocks are cleared may be moved away from the game end determination line while the other game field in which the smallest numbers of small blocks are cleared may be moved closer to the game end determination line. Alternatively, an average of the numbers of small blocks cleared in respective game fields may be obtained. The game field(s) in which the above-average numbers of small blocks are cleared may be moved away form the game end determination line, while the other game field(s) in which the below-average numbers of small blocks are cleared may be moved closer to the game end determination line. In this case, the distance of the movement of each game field may be determined based upon the difference between the numbers of blocks cleared in own game field and the average number.

In a further alternative embodiment, the field position movement controller may causes the game field of which position has been once moved to return to an initial position at which it is positioned at the beginning of the game. Specifically, the field position movement controller 114 may cause the game field to move closer to or away from the game end determination line at step S28 and then causes the game field to move again so as to return to the initial position in a predetermined time period from the movement processing executed at step S28. In this case, the field position movement controller 114 may change the predetermined time period to be counted and the distance of movement toward the initial position based upon the distance of the movement made at step S28. More specifically, as more small blocks are cleared at a single clearance processing or from the beginning of the chain reaction of clearances to the end thereof and thereby the distance of the movement of the game field at step S28 gets longer, the field position movement controller 114 may shorten the time period to be counted and lengthen the distance of the movement of the game field to the initial position. On the contrary, as less small blocks are cleared at a single clearance processing or from the beginning of the chain reactions of clearances to the end thereof and thereby the distance of the movement of the game field gets shorter, the field position movement controller 114 may lengthen the time period to be counted and shorten the distance of the movement of the game field towards the initial position. FIG. 9 is a table showing an example of the number of cleared small blocks, the distance of the movement of the game field towards or away from the game end determination line and the distance of the movement of the game field back to the initial position. For example, according to this table, in the case where five small blocks are cleared at a single clearance processing by the object clearance controller 113, the game fields are moved up or down respectively by a distance equal to one row along with the Y-axis on the display screen 15a, and then, in fifteen seconds, they are caused to return to the previous position by one row. Also, in the case where ten small blocks are cleared in a single clearance processing by the object clearance controller 113, the game fields are moved up or down respectively by a distance equal to two rows along with the Y-axis on the display screen 15a and then, every ten seconds since the movement, they are caused to return toward their previous positions by a distance equal to one row. Also, in the case where twenty small blocks are cleared from the start of the chain reactions of the clearances to the end thereof, the game fields are moved up or down respectively by a distance equal to five rows along with the Y-axis on the display screen 15a and then, every five seconds since the movement, they are caused to return toward their previous positions by a distance equal to one row. Thus, it is possible to realize various ways of game progress, depending on causing the game fields to move by a long distance by the chain reactions of clearances or causing the game fields to move by a short distance repeatedly at short time intervals by clearing a small number of blocks repeatedly.

In the embodiment described above, the first game field 151 and the second game field 152 are provided at the same height on the display screen 15a at the beginning of the game play. However, in an alternative embodiment, the players may arbitrarily decide the positions of the game fields before the game starts. This allows the players to use handicaps, and thereby allowing more evenly matched game even when one player is an expert and the other is a beginner. Alternatively, handicaps may be provided by allowing the players to set different distances of the movement of the game fields or timings of the emergence of the small blocks player by player.

Although the small block is taken as an example of object in the embodiment described above, in an alternative embodiment, any characters, shapes or number symbols may serve as objects. In the case where the number symbols are provided, the arrangement condition may be the neighboring number symbols that come to a predetermined value in total.

In the embodiment described above, a player(s) plays the game with a single video game apparatus. However, in a further alternative embodiment, the present invention may be applied to an online game using a communications line or radio communication. For example, two or more players may use their respective video game machines at different locations. In this case, the game fields are assigned to different respective one of multiple players. That is, the game field displayed on the right side of the display screen is assigned to one player, while the game field displayed on the left side of the display screen is assigned to the other player. The players operate their respective game machines, and data input to respective operating sections are sent to a server controlling the game progress. The server executes processing for the object emergence control, the object movement control, the object clearance control, the field movement control and the game termination control, and processed data are sent to the video game machines of respective players. Each video game machine displays images on the display based upon the data received from the server. Thus, by applying the present invention to an online game, players in different places may enjoy a battle.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A video game apparatus having an operation unit for receiving a player's input and a display for displaying at least two game fields, the game apparatus comprising:
   an object displayer that displays objects which sequentially appear from a predetermined position on each of the game fields;
   an object mover that moves a position of the objects displayed by the object displayer based upon the input to the operation unit;
   an object clearer that clears objects satisfying a predetermined arrangement condition;
   a game termination controller that causes a game to end when objects that are not cleared and stack in at least one of the game fields reach to a line at a predetermined position on the display;
   a field mover that displaces at least one of the game fields in a direction away from the line while displacing the other game fields in a direction towards the line when a field displacement condition is satisfied in any one of the game fields, the field displacement condition being associated with clearing of the objects by the object clearer.

2. The video game apparatus according to claim 1, wherein the objects displayed by the object displayer comprise a plurality of kinds of objects, and wherein the object clearer clears a predetermined number of the objects of a same kind among the plurality of the kinds that are arranged without gaps.

3. The video game apparatus according to claim 1, wherein the field displacement condition comprises a condition in which the object clearer clears the objects in any one of the game fields.

4. The video game apparatus according to claim 1, wherein the field mover increases a distance of displacement of the game field in proportion to a number of the objects cleared by the object clearer.

5. The video game apparatus according to claim 1, further comprising a field re-mover that redisplaces at least one game field displaced by the field mover towards a direction of an initial position at which the game field is positioned at a beginning of the game.

6. The video game apparatus according to claim 5, further comprising a timer that counts a predetermined period of time elapsed since the displacement of at least one of the game fields by the field mover, wherein the field re-mover redisplaces at least one of the game fields towards the initial position by a predetermined distance at least when the timer counts the predetermined period of time elapsed since the displacement of the game field by the field mover, and wherein the predetermined period of time to be counted by the timer is decreased in proportion to the number of objects cleared by the object clearer.

7. The video game apparatus according to claim 1, wherein the game fields are assigned to respective players of the game, and wherein the object mover moves the objects displayed in each of the game fields assigned to the players based upon an input by each player to the operation unit.

8. A non-transitory computer-readable storage medium containing a video game program executable by a computer provided in a video game apparatus for causing the video game apparatus to process a game, the video game apparatus including an operation unit for receiving a player's input and a display for displaying at least two game fields of the game, the program causing the video game apparatus to execute:

displaying objects which sequentially appear from a predetermined position on each of the game fields;

moving a position of the objects displayed based upon the input to the operation unit;

clearing objects satisfying a predetermined arrangement condition;

causing the game to end when objects that are not cleared and stack in the game field reach to a line at a predetermined position on the display; and displacing at least one of the game fields in direction away from the line while displacing the other game fields in a direction towards the line when a field displacement condition is satisfied in any one of the game fields, the field displacement condition being associated with the clearing of the objects.

9. A video game processing method for a video game apparatus having an operation unit for receiving a player's input and a display for displaying at least two game fields, the method comprising:

displaying objects which sequentially appear from a predetermined position on each of the game fields;

moving a position of the objects displayed based upon the input to the operation unit;

clearing objects satisfying a predetermined arrangement condition;

causing a game to end when objects that are not cleared and stack in the game field reach to a line at a predetermined position on the display; and displacing at least one of the game fields in a direction away from the line while displacing the other game fields in a direction towards the line when a field displacement condition is satisfied in any one of the game fields, the field displacement condition being associated with the clearing of the objects.

* * * * *